United States Patent
Fei et al.

(10) Patent No.: US 10,910,140 B2
(45) Date of Patent: Feb. 2, 2021

(54) MATRIX TRANSFORMER AND WINDING STRUCTURE

(71) Applicant: Virginia Tech Intellectual Properties, Inc., Blacksburg, VA (US)

(72) Inventors: Chao Fei, Blacksburg, VA (US); Fred C. Lee, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 401 days.

(21) Appl. No.: 15/656,198

(22) Filed: Jul. 21, 2017

(65) Prior Publication Data

US 2018/0226182 A1  Aug. 9, 2018

Related U.S. Application Data

(60) Provisional application No. 62/454,328, filed on Feb. 3, 2017.

(51) Int. Cl.
| | |
|---|---|
| H01F 17/04 | (2006.01) |
| H01F 27/245 | (2006.01) |
| H01F 27/28 | (2006.01) |
| H02M 3/335 | (2006.01) |
| H01F 27/30 | (2006.01) |
| H02M 3/28 | (2006.01) |

(Continued)

(52) U.S. Cl.
CPC ....... *H01F 27/245* (2013.01); *H01F 27/2804* (2013.01); *H01F 27/306* (2013.01); *H02M 3/285* (2013.01); *H02M 3/3376* (2013.01); *H02M 3/33523* (2013.01); *H02M 3/33592* (2013.01); *H01F 27/38* (2013.01); *H01F 2027/2809* (2013.01); *H01F 2027/2819* (2013.01); *H01F 2038/006* (2013.01); *Y02B 70/10* (2013.01)

(58) Field of Classification Search
CPC .. H01F 2017/048; H01F 29/292; H01F 27/24; H01F 17/0006; H01F 2038/006
USPC ......................................................... 336/221
See application file for complete search history.

(56) References Cited

U.S. PATENT DOCUMENTS

| | | | | |
|---|---|---|---|---|
| 5,126,714 A | * | 6/1992 | Johnson | ............... H01F 19/04 336/183 |
| 5,801,602 A | * | 9/1998 | Fawal | ............... H01F 17/0006 333/177 |

(Continued)

*Primary Examiner* — Alexander Talpalatski
(74) *Attorney, Agent, or Firm* — W&C IP (57) ABSTRACT

A matrix transformer particularly suited to large voltage step-down, high current applications achieves increased good current sharing uniformity or air gap and electrical characteristics and reduced or eliminating termination losses, core losses and winding losses with a unitary magnetic core structure featuring sheets of magnetic material and a two-dimensional array of pillars on which windings, oriented in opposite directions on pillars that are adjacent in orthogonal directions, can be formed or placed comprising metallization on or embedded in a printed circuit board (PCB) structure. Magnetic flux density is reduced by at least one-half by dividing the magnetic flux in each pillar into two paths of increased width in the sheets of magnetic material. Magnetic flux density may be further decreased and flux uniformity improved by extending the sheets of magnetic material beyond a periphery defined by the pillar array.

8 Claims, 9 Drawing Sheets

(51) Int. Cl.
*H02M 3/337* (2006.01)
*H01F 27/38* (2006.01)
*H01F 38/00* (2006.01)

(56) References Cited

U.S. PATENT DOCUMENTS

| | | | | |
|---|---|---|---|---|
| 6,049,258 | A * | 4/2000 | Fawal | H01F 17/0006 333/177 |
| 6,867,678 | B2 * | 3/2005 | Yang | H01F 27/2804 336/200 |
| 7,280,026 | B2 * | 10/2007 | Chandrasekaran | H01F 27/24 336/212 |
| 7,289,329 | B2 * | 10/2007 | Chen | H01F 27/2804 165/185 |
| 7,417,875 | B2 * | 8/2008 | Chandrasekaran | H02M 3/33592 363/17 |
| 8,004,867 | B2 * | 8/2011 | Nakahori | H02M 3/335 363/56.05 |
| 8,339,808 | B2 * | 12/2012 | Nakahori | H01F 27/2804 363/17 |
| 9,336,941 | B1 * | 5/2016 | Ikriannikov | H01F 27/29 |
| 9,653,983 | B2 * | 5/2017 | Kurita | H01F 37/00 |
| 2006/0187684 | A1 * | 8/2006 | Chandrasekaran | H02M 3/337 363/16 |
| 2015/0123479 | A1 * | 5/2015 | Kurita | H02J 3/382 307/66 |

* cited by examiner

RELATED ART

*Figure 4*

RELATED ART

MATRIX TRANSFORMER AND WINDING STRUCTURE

CROSS-REFERENCE TO RELATED APPLICATIONS

This application claims benefit of priority of U.S. Provisional Application 62/454,328, filed Feb. 3, 2017, which is hereby incorporated by reference in its entirety.

FIELD OF THE INVENTION

The present invention generally relates to transformers for supplying power to electronic devices and, more particularly, to so-called matrix transformers for large voltage step-down, high current power converter applications.

BACKGROUND OF THE INVENTION

While electrical power is usually distributed from the location at which it is generated to the location at which it is utilized as high voltage alternating current (AC) in order to limit transmission infrastructure cost and transmission losses, most electrically powered devices other than electric motors present loads requiring low voltage, direct current (DC) power, often at a closely regulated voltage. While the voltage used for AC power transmission can be easily reduced to lower voltage alternating current by transformers for local power distribution, dedicated power supplies that may be integrated into the devices to be powered or separate power supplies to which such devices may be connected must be used to supply specific low DC voltages for device operation and/or battery charging. In such power supplies, including DC/DC power supplies, transformers may also be included to obtain particular required voltages and/or for electrical isolation.

An example of a device requiring very low voltages and potentially high currents is a digital data processor or computer server. In such devices which employ extremely large numbers of semiconductor switches in close proximity to each other and operating at extremely high switching frequencies, limitations on operating temperature requires that the logic-level voltage be very low and often only a fraction of a volt in state of the art logic arrays while the total current required may be tens to hundreds of amperes which can result in substantial conduction losses in synchronous rectifier switches and other problems including high cost of high current switching devices.

To meet such high current requirements at a reasonable cost, conventional power converter designs to date have included parallel connections of synchronous rectifiers to reduce conduction losses and allow use of less expensive switches having a lower current rating than the total current required by the load. However, such designs present problems of both static and dynamic current sharing, a large sum of high frequency and high di/dt AC current flowing through a common termination point; causing termination losses and large leakage inductance at the transformer secondary windings; resulting in large winding losses.

To address some of these problems to some degree, a design including a so-called matrix transformer has been proposed. A matrix transformer is defined as a transformer structure which is divided into several ideally identical transformers connected to function as a single transformer. However, the construction of the transformers comprising the matrix transformer cannot, as a practical matter, be made to be electrically or magnetically identical and thus the above-described problems remain to a significant degree in power converter designs including matrix transformers while the volume, weight and cost of windings and cores and their assembly are far from optimal and have not been amenable to construction using printed circuit board (PCB) winding structures.

SUMMARY OF THE INVENTION

It is therefore an object of the present invention to provide a matrix transformer core and winding topology which more fully addresses problems of current sharing, termination losses and winding losses.

It is another object of the invention to provide a matrix transformer structure that can be embodied using printed circuit board (PCB) winding structures.

It is a further object of the invention to provide a magnetic circuit topology in parts of which magnetic flux is reduced by at least a factor of two, allowing core weight and volume and/or core losses to be reduced as compared with known matrix transformer designs.

It is yet another object of the invention to provide a simplified structure for a matrix transformer that assures that the individual transformers constituting the matrix transformer have substantially identical electrical characteristics and performance.

In order to accomplish these and other objects of the invention, a matrix transformer and power converter particularly suitable for large voltage step-down and high current applications are provided wherein the matrix transformer comprises first and second sheets of magnetic material, a plurality of pillars of magnetic material extending between the first and second sheets of magnetic material in an array extending in orthogonal directions, and a primary winding and a secondary winding on respective pillars wherein a winding direction of respective primary windings is opposite a winding direction of a primary winding on an adjacent pillar in each of said orthogonal directions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
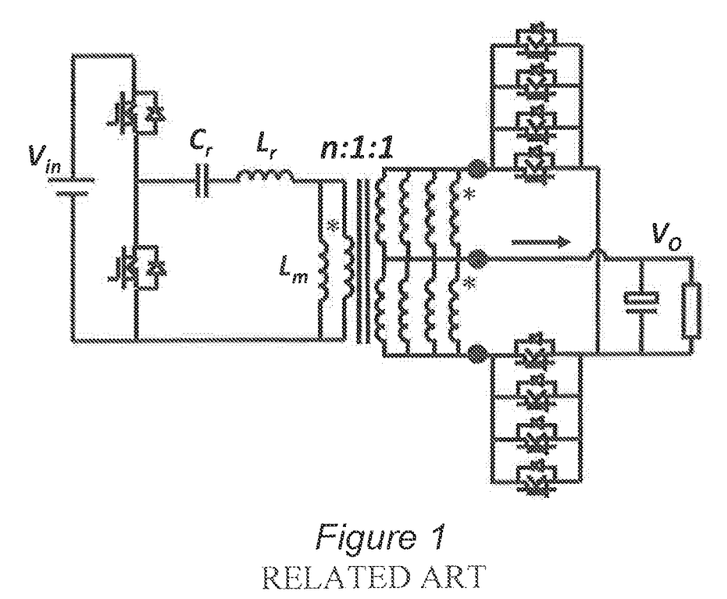
FIG. 1 is a schematic diagram of a conventional DC/DC converter.
Figure 3:
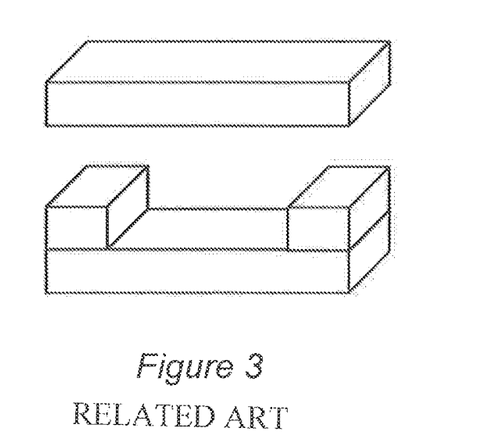
FIG. 3 is an oblique view of a simplified form of a UI-shaped set of magnetic core elements.
Figure 4:
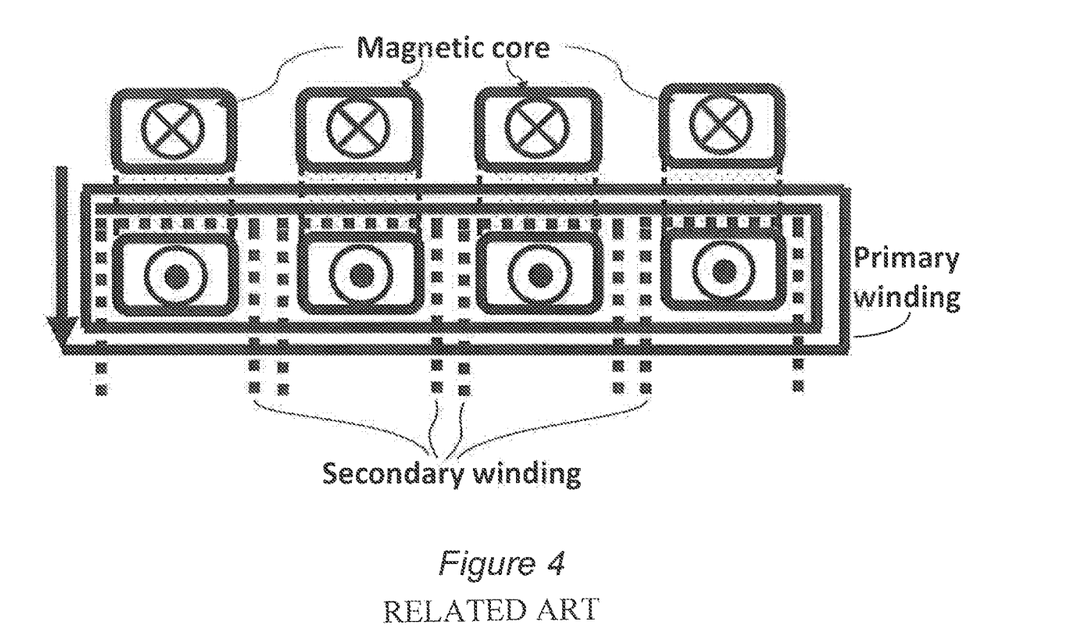
FIG. 4 illustrates formation of a primary winding on four magnetic cores of a matrix transformer such as that of the DC/DC converter of FIG. 2.

Referring now to the drawings, and more particularly to FIG. 1, there is schematically shown a conventional design of a DC/DC converter for a large voltage step-down, high current application. It should be appreciated that the power converter design illustrated in FIGS. 1 and 2 and the design of FIGS. 3 and 4 are generalized and arranged to facilitate an understanding of the problems addressed by the invention and are not admitted to be prior art as to the present invention. These Figures have thus been labeled "Related Art". Also, for convenience and clarity, the illustration and discussion of both the related art of FIGS. 1-4 and the following discussion of the invention will assume a division of the high current portion of the power converter into four branches while any number of separate parallel branches can be provided as the load requirements and the cost of electrical elements having a given current capacity and rating may dictate. Further, for clarity and convenience, both the related art and the invention will be illustrated and discussed in terms of a DC/DC converter while the principles of the invention are equally applicable to AC/DC converters (which will generally provide low frequency AC/DC conversion on the primary side of the transformer to provide $V_{in}$ which can then be converted to high frequency AC by switching for application to the primary winding of the transformer.

In this design, as shown in FIG. 1, the input power source, $V_{in}$, is periodically connected to and disconnected from the transformer primary winding at high frequency through a resonant series $C_r$, $L_r$, connection by a so-called top switch. The switching frequency is not critical but is chosen as a trade-off between transient response and switching losses.

A so-called bottom switch is operated in a substantially complementary fashion to the top switch and supplies "freewheel" current to the transformer primary winding when the top switch disconnects the power source, $V_{in}$. Magnetizing inductance, $L_m$, through which a small magnetizing current will flow is also shown in the primary side of the transformer. The magnetizing inductance plays an important role in some power converter topologies but is not otherwise important to the understanding or successful practice of the invention in accordance with its basic principles. It should, however, be recognized that the leakage inductance on the secondary side of the transformer as alluded to above is effectively included within the resonant inductance, $L_r$.

On the secondary side of the transformer, a plurality of center-tapped coils are connected in parallel and their currents combined at termination point nodes indicated by black dots. The output power, Vo, is taken from the center taps of all of the center-tapped coils. A plurality of synchronous rectifiers are also connected in parallel in groups to complete the circuit from the filter capacitor and load to the respective end terminals of the center-tapped coils.

While, in theory, the parallel secondary windings and parallel synchronous rectifiers (SRs) can provide total currents well in excess of the current tolerance and ratings of the individual coils and synchronous rectifiers, small differences in electrical properties of these elements, in practice, can cause significant imbalances in current sharing as alluded to above. The differences in electrical properties can be exacerbated by temperature differences among these elements caused by such unequal currents. Further, in such a topology, termination points between the secondary windings and the synchronous rectifiers are unavoidable, at which the high frequency and high di/dt AC currents cause significant termination losses. The physical separation of the parallel secondary windings also makes the leakage inductances of the secondary windings significant and unavoidable; causing large winding losses.

Figure 2:
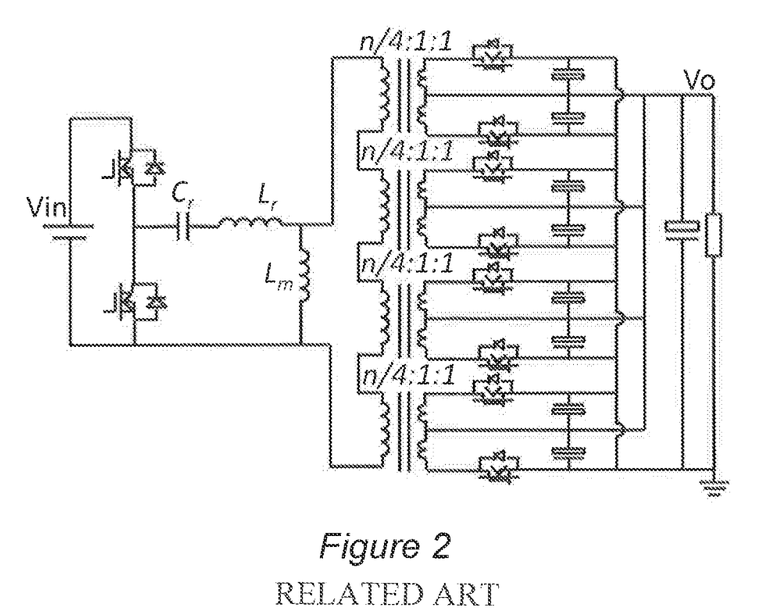
FIG. 2 is a schematic diagram of a DC/DC converter design including a matrix transformer having four magnetic cores.

Referring now to FIG. 2, an alternate exemplary design for a DC/DC converter is schematically shown which addresses the problems of the converter of FIG. 1 to some degree by use of a matrix transformer. In this design, the transformer is divided into four individual and possibly physically separate transformers with the primary windings connected in series. Each of the divided transformers has a single secondary (in this example, also center-tapped) winding to provide current to a separate respective branch with the branches connected to the load in parallel. In operation, since the primary windings (each including an equal fraction of the number of turns required for the desired voltage step-down) are connected in series, the primary winding currents are identical and the secondary side currents are necessarily well-balanced to achieve current sharing. The termination point nodes, where the currents of the respective branches are combined, are on the DC side of the synchronous rectifiers and thus not subject to high frequency or high di/dt AC currents. Thus, termination losses are reduced. Further, since the secondary windings are in separate transformers, secondary winding leakage inductances can be held to a low level to limit winding losses.

The primary drawback of such a DC/DC converter design is the volume of the separate identical transformers comprising the matrix transformer which have separate primary and secondary windings and cores. As a practical matter for transformer manufacture, transformer cores are usually formed in two (or more) pieces to allow the windings to be separately fabricated and then installed on a portion of the core and the assembly of the core completed thereafter. A pair of core elements of generally preferred complementary shapes is illustrated in a simplified form in FIG. 3 and is referred to as a UI-shape in view of the cross-sectional shape of the respective core portions which include two upstanding (in this example, rectangular cross-section or prismatic configuration but a circular cross-section or cylindrical configuration is generally preferred) legs, generally referred to as pillars. Other complementary shapes for the respective core portions are, of course, possible and, when assembled, form a substantially closed magnetic circuit in the general form of a toroid. Regardless of the core portion shapes, the location where the portions abut each other results in at least a small air gap which, while small, is difficult to achieve uniformity of size; affecting flux, flux density and leakage.

Given that the electrical windings must surround the periphery of a core element and at least the primary winding must comprise a plurality of turns to achieve voltage step-down, the resulting volume is necessarily irregular. (It is common practice to form the secondary winding as a single turn that does not require significant volume and can be located in any of a plurality of locations on the core. Therefore, illustration of the secondary winding is omitted in many of the Figures but is illustrated in FIGS. 4, 7A and 10A-10D.) Such irregular shapes cannot be nested together in a particularly compact form and the number of cores increases the weight of the matrix transformer.

Perhaps the most compact arrangement of the cores and windings of the matrix transformer of FIG. 2 is shown in FIG. 4. In FIG. 4, for clarity, the number of turns of the primary winding illustrated is two but it is to be understood that any number of turns can be provided, as required by the amount of required voltage step-down. in this case, the cores are positioned in a similar orientation and the primary winding located on a corresponding pillar of each core. A direction of current flow is indicated by an arrowhead shape on the primary winding and the resulting magnetic flux in the core is illustrated by circles with a dot or cross indicating flux direction out of or into the page, respectively. Since the current in the primary winding is necessarily identical in regard to all of the cores and generate an identical magnetic flux in each core, such a winding common to all cores is equivalent to individual, series connected windings on the individual cores as illustrated in FIG. 2. It is also difficult to achieve uniformity of air gaps which affect the magnitude of magnetic flux generated by primary winding current when the core is comprised of plural portions. Additionally, it is difficult to assemble cores and windings (e.g. with a single turn secondary winding for each core) which are oriented as illustrated in FIG. 4. The cores are not unitary and magnetic coupling between cores may also be a source of non-uniformity of transformers of the matrix transformer constituted in such a manner.

Figure 5A:
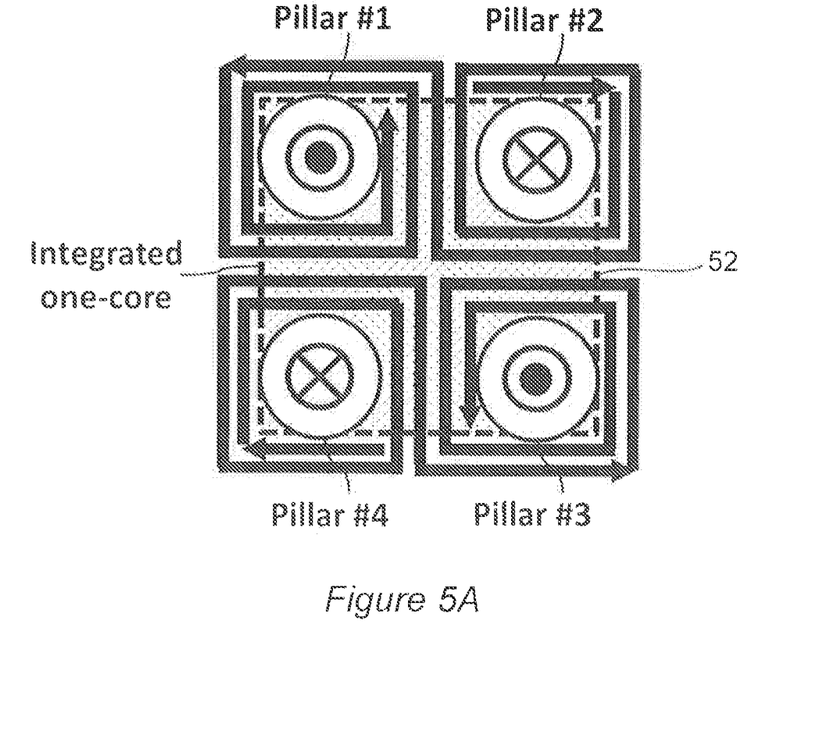
FIG. 5A illustrates a simplified form of a magnetic core and winding integration of a four transformer matrix transformer in accordance with the invention.
Figure 5B:
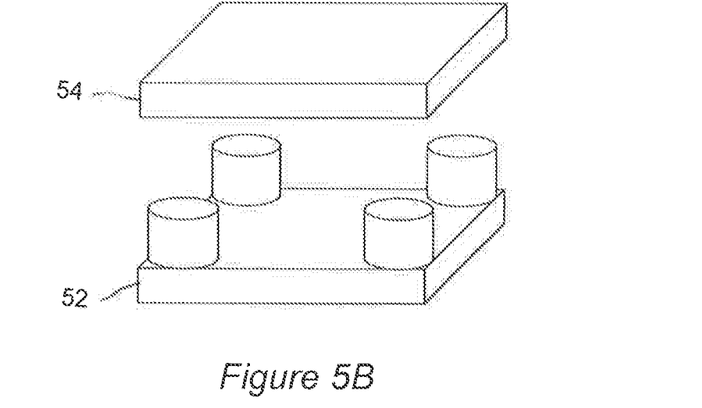
FIG. 5B is an oblique view of a simplified form of a magnetic core suitable for use in the invention.

Referring now to FIGS. 5A and 5B, a unitary matrix transformer with an integrated core in accordance with the invention is shown in schematic form. Essentially, the magnetic core comprises a plurality of (in this example, round) pillars #1-#4 of material of relatively high permeability, referred to hereinafter as magnetic material (preferably, symmetrically arranged) on a sheet of a similarly magnetic material 52 on which respective portions of the primary winding are placed with the windings on orthogonally adjacent pillars being wound in opposite directions (e.g. clockwise on pillars #2 and #4 and counter-clockwise on pillars #1 and #3) with the windings being serially connected; the serial connection of pillars #1 and #2 and pillars #3 and #4 being shown in FIG. 5A while the serial connection of pillars #2 and #3 is omitted in FIG. 5A for clarity and since it cannot be physically formed in the same plane as the windings as schematically illustrated (e.g. in a single plane) in FIG. 5A. The pillars can be and preferably are integrally formed with sheet 52 or attached to it. The magnetic core is completed by attachment of sheet 54 to the tops (e.g. opposite ends) of the pillars. This magnetic core structure guarantees that each transformer of the matrix transformer in accordance with the invention shares the same air gap(s). Thus the primary winding current produces a magnetic flux and flux pattern that is substantially uniform for all transformers of the matrix transformer and that coupling between transformers will be uniform Leakage inductance will also be low and uniform.

Figure 6:
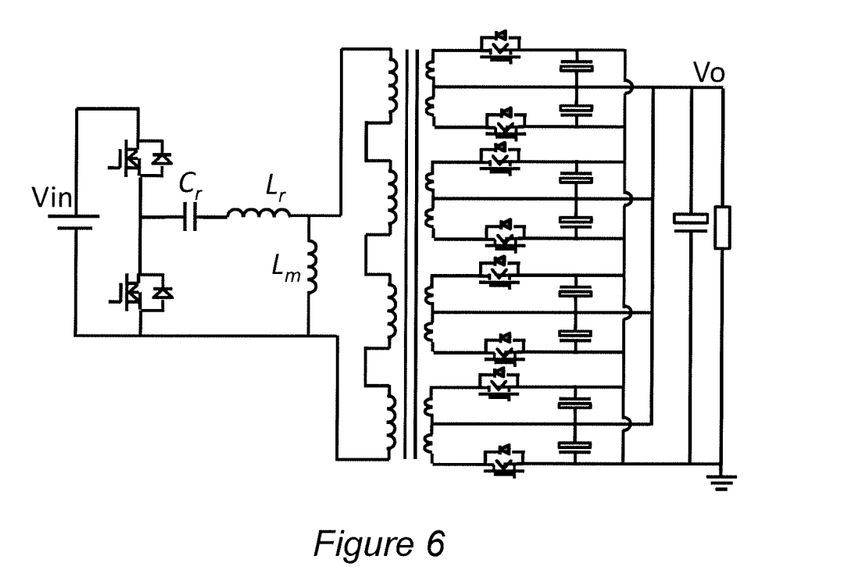
FIG. 6 is a schematic diagram of an exemplary DC/DC converter employing a matrix transformer in accordance with the invention as illustrated in FIGS. 5A and 5B, FIGS. 7A and 7B illustrate arrangements of a two core matrix transformer that demonstrate that the matrix transformer of FIG. 5A is electrically identical to the transformers of the matrix transformer of FIG. 4 but do not achieve the meritorious effects of the invention.

A schematic diagram of an exemplary DC/DC converter including the matrix transformer in accordance with the invention is illustrated in FIG. 6. It will be noted that FIG. 6 is identical to that of FIG. 2 except for the illustration of coupling between all transformers in FIG. 6 whereas the respective transformers are not illustrated as being coupled to each other in FIG. 2 and, in fact, any coupling will be incidental due to proximity or core and coil configuration and thus unpredictable.

Figure 7A:
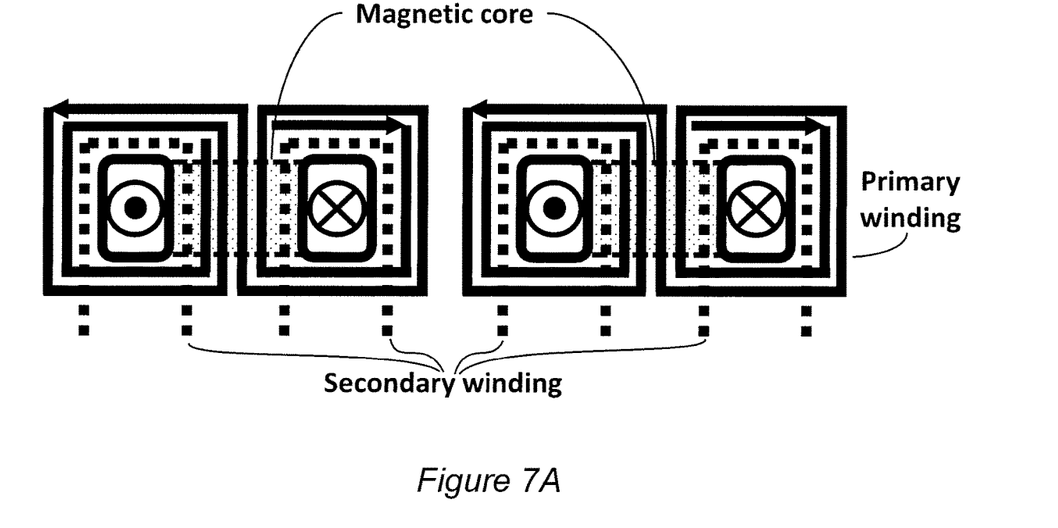
Figure 7B:
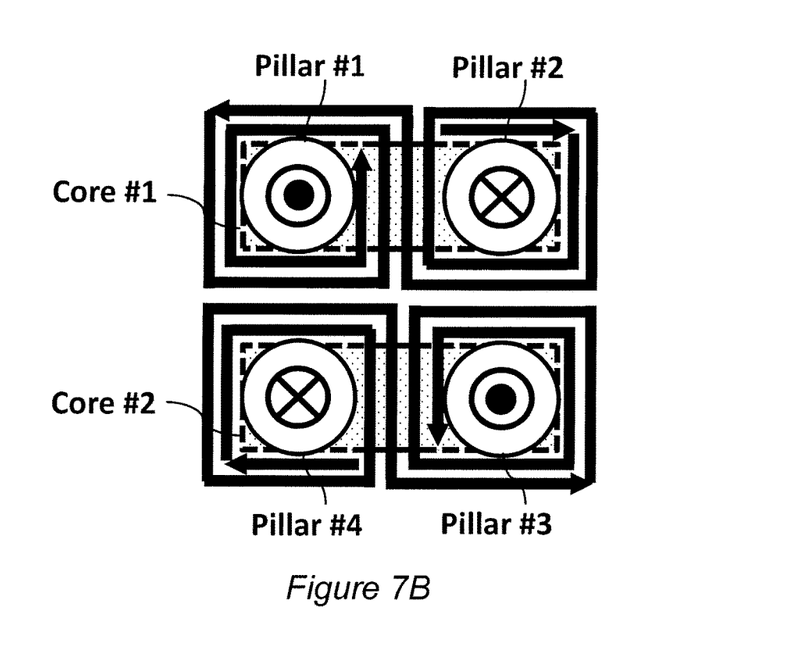

Referring now to FIGS. 7A-7B, it can be shown through a two-stage rearrangement of cores and windings that both the electrical and magnetic topology of FIG. 5A is identical to that of FIG. 4 but is even more compact and not only reduces the number of cores but provides for an equivalent magnetic circuit to be integrated into a single unitary structure which is potentially highly symmetrical and of increased uniformity of the constituent transformers of the matrix transformer in accordance with the invention.

Specifically, the four core structure of FIG. 4 can be integrated into a two core structure as shown in FIG. 7A by the simple expedient of placing adjacent primary windings on respective sides of each of two cores with the direction of windings reversed between sides of each core. This process is referred to as flux cancellation since the number of flux paths is reduced between those of FIG. 4 and FIG. 7A. The flux density is not increased in the two cores since voltage*seconds remains the same because the voltage applied to the core is the output voltage and the time of application (usually about one-half the switching period) is not changed. That is, in a transformer, the number of ampere turns of the primary and secondary windings are (ideally) the same but opposite in direction, resulting in magnetic field strength near zero since the net enclosed current is substantially zero. Thus the voltage applied to the core is the output voltage and the duration of that the voltage is applied to the core is approximately one-half the switching period to determine the total flux, $\Phi$, in accordance with an integration of voltage*time which swings between positive peaks and negative valleys. The core loss per unit volume is determined by the flux density, $B=\Phi$/cross-sectional area, and is unchanged in FIGS. 7A and 7B since the cores are assumed to be unchanged in dimensions but is reduced in accordance with the invention as will be discussed in greater detail below.

The rearrangement of FIG. 7A can be further rearranged to that of FIG. 7B by simply rotating one of the cores by 180° and placing the cores side-by-side as shown by FIG. 7B to result in the arrangement of sides/pillars and directions of magnetic flux that coincide with the invention as shown in FIG. 5A. However, there is no functional change achieved by doing so since the respective cores are not significantly coupled magnetically.

It should be appreciated that while such a rearrangement of FIG. 4 to that of FIG. 7A and rearrangement of FIG. 7A to that of FIG. 7B could be done, there is no reason for either such rearrangement other than this demonstration that no change in the electrical or magnetic properties of the transformers would occur. While the number of cores is reduced and the arrangement possibly made slightly more compact by the rearrangement of FIG. 4 to that of FIG. 7A, that reduction requires substantially increased complexity of the primary winding construction and connection while no functional, electrical or magnetic change is achieved. Further, there is no change of any sort achieved by the rearrangement of FIG. 7A to that of FIG. 7B other than to make the arrangement of pillars coincide with that of the invention which achieves flux density reduction in the top and bottom sheets 52 and 54 of magnetic material as well as increased electrical and magnetic uniformity of the transformers of the matrix transformer by assuring that all transformers share the same air gap and are all coupled by a common, unitary core structure that is highly robust and potentially fully symmetrical.

Figure 8A:
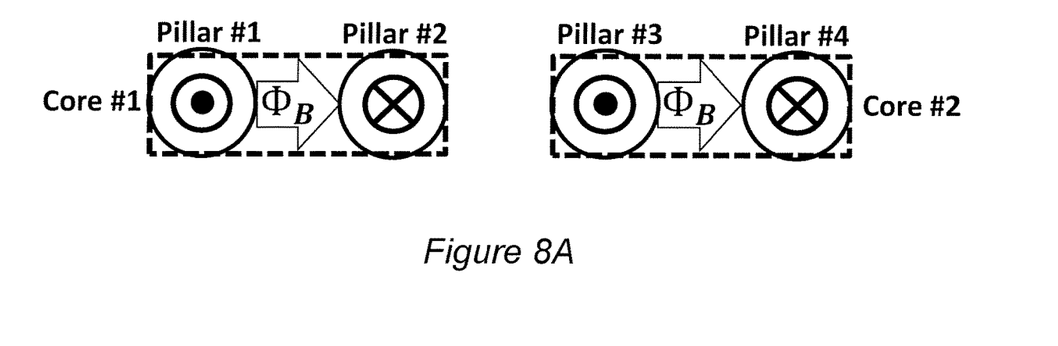
FIGS. 8A and 8B illustrate the improvement in magnetic flux distribution and reduction of flux density achieved by the invention.
Figure 8B:
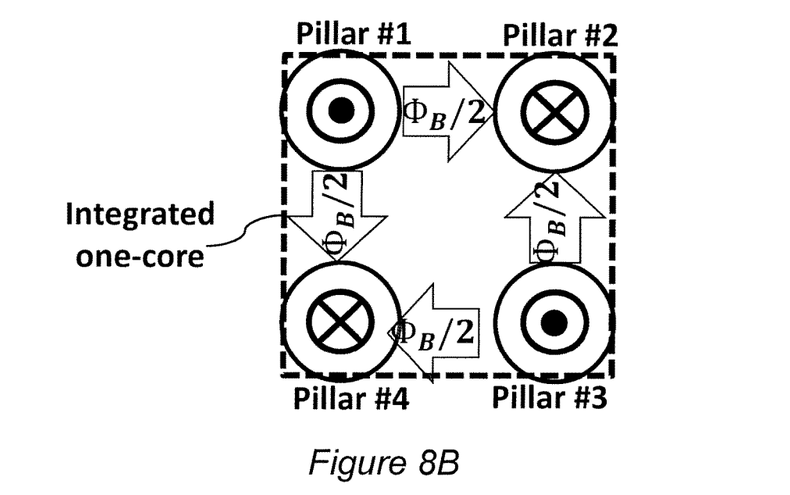

Further, the invention additionally provides for a reduction in flux density which tends to reduce core losses that is not achieved in either of the rearrangements of FIG. 7A or 7B as alluded to above. Specifically, FIG. 8A illustrates the flux density, $\Phi_B$, in individual cores (and pillars) of FIG. 4. In sharp contrast therewith, as shown in FIG. 8B the flux in each pillar is divided into separate paths through the top and bottom magnetic material sheets 52 and 54 to other adjacent pillars in which the magnetic flux is in the opposite direction. Thus, in a four pillar embodiment, the flux density will be reduced in sheets 52 and 54 by at least one-half (assuming cross-sectional area remains the same) and, in practice, somewhat more due to the increased effective width of the flux paths. Thus the more evenly distributed flux density achieved by the invention results in comparatively reduced core losses.

Figure 9:
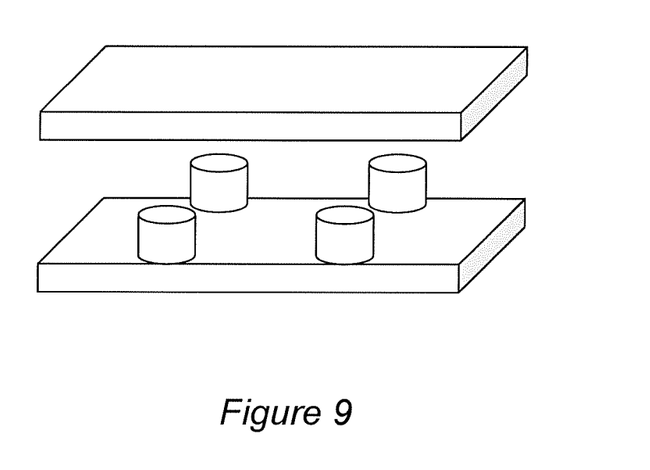
FIG. 9 is an oblique view of an alternative form of the magnetic core structure in accordance with the invention and preferred for some applications.

In this regard and as a perfecting feature of the invention, further increased evenness of magnetic flux distribution can be achieved by extending the sheets 52 and 54 beyond a periphery defined by the pillars in either or both orthogonal directions as shown in FIG. 9 by a non-critical amount. Such an extension provides additional width of some or all of the flux paths illustrated in FIG. 8B to further reduce core losses. Alternatively or in combination therewith, thickness of sheets 52 and 54 can be reduced to reduce weight of the matrix transformer in accordance with the invention.

It should be appreciated that substantial reduction in flux density in both directions can be achieved even if the top and bottom sheets are only extended in one direction. That is, the decrease in reluctance in a direction orthogonal to the extension due to the increase in flux path width will cause the magnetic flux in the top and bottom sheets to be divided in inverse proportion to the effective flux path width to reduce the flux density in a direction parallel to the direction of top and bottom sheet extension even if the top and bottom sheets can only be extended in one of two orthogonal directions. For example, if synchronous rectifiers are provided on the same printed circuit boards as form secondary windings as will be discussed below as a further perfecting feature of the invention and which is considered desirable to minimize leakage and eliminate termination loss, surface mounting or embedding of the synchronous rectifier and/or filter capacitor on a printed circuit board also providing a secondary winding may physically preclude extension of sheets 52 and 54 in the direction in which the synchronous rectifiers and/or filter capacitors are mounted.

As a further perfecting feature of the invention alluded to above, the matrix transformer in accordance with the invention can also be implemented with primary and/or secondary windings provided by conductive layers on or embedded within one or more printed circuit board structures comprising, for example, one or more metallization layers on or embedded within a sheet of insulating material. Referring now to FIGS. 10A-10D, an exemplary embodiment of the invention using printed circuit board (PCB) windings will now be discussed. While the exemplary embodiment will be described in terms of a four layer PCB structure with four pillars and a four transformer matrix transformer with two-turn primary windings and single turn secondary windings in each transformer in a manner consistent with the above discussion of the basic principles of the invention, it should be appreciated that the basic principles of PCB winding structures in accordance with the invention are applicable to any number of PCB metallization layers, pillars and primary and secondary winding turns as may be required for a given application. It should also be appreciated that the PCB winding patterns illustrated in FIGS. 10A-10D use virtually all of the metallization (e.g. copper) area of each layer to limit conduction losses for a given PCB structure size and number of winding turns. Limitation of conduction losses can also be achieved by increased thickness of metallization or by placing additional, parallel connected patterned layers in the PCB structure. In this regard, the four PCB patterns illustrated is, itself, a minimum number of layers providing all necessary connections in or on the winding assembly that is particularly desirable for economy and simplicity of manufacture although difficult to achieve. It should further be appreciated that, since the primary and secondary windings are assembled on a pattern of pillars and are thus coaxial, many different interleaving (e.g. the order of the PCB layers on the pillars) structures can be used as may be convenient for making connections to and between the PCB layers with little effect on electrical properties of the matrix transformer and the order illustrated in FIGS. 10A-10D should be regarded as exemplary although it is somewhat preferred for reduction of length and inductance of connections to and between PCB layers and leakage inductance.

Figure 10A:
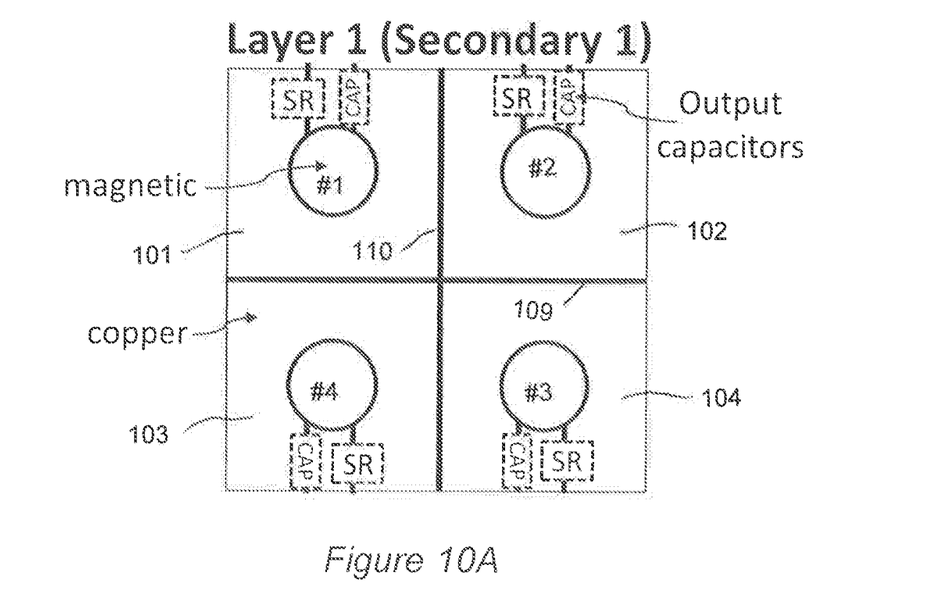
FIGS. 10A, 10B, 10C and 10D are plan view of winding layouts suitable for implementation on four printed circuit board (PCB) layers or four layers of a PCB integrated winding structure.
Figure 10B:
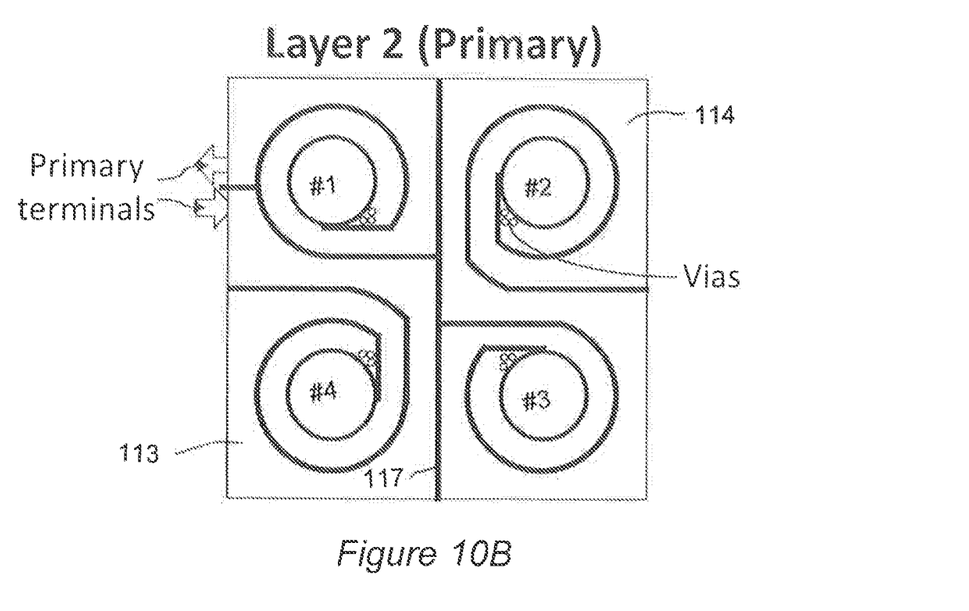
Figure 10C:
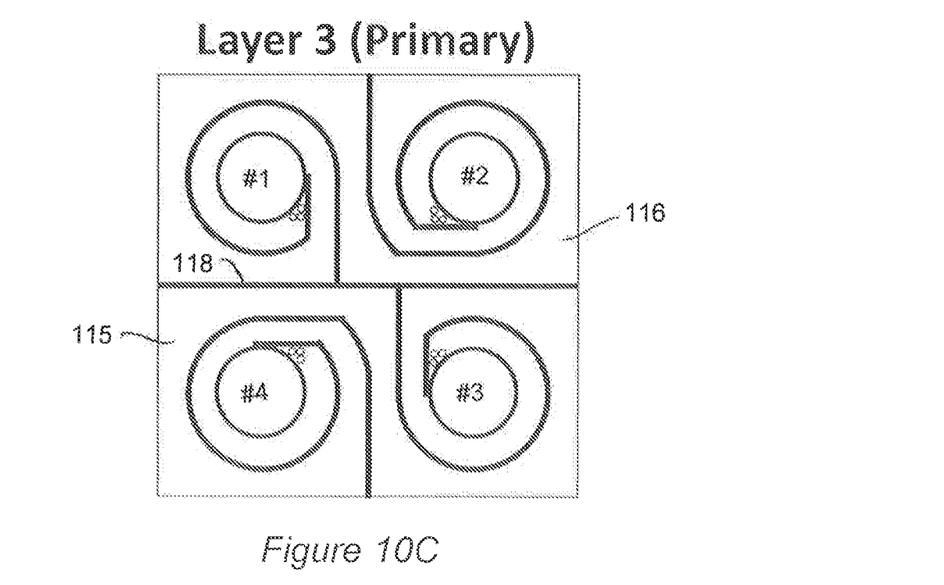
Figure 10D:
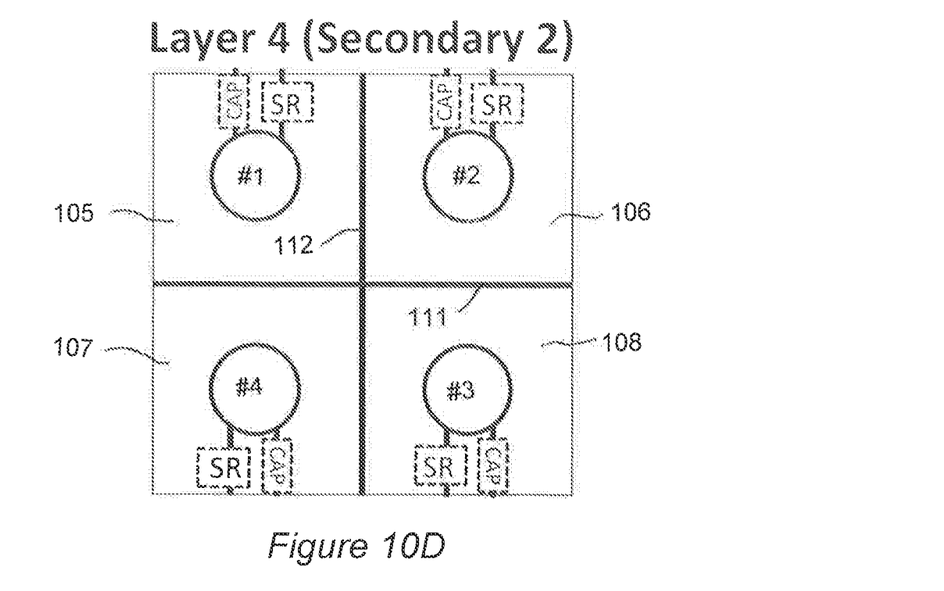

FIGS. 10A and 10D each provide four single turn secondary windings 101-104 and 105-108, respectively, and thus the metallization pattern of each of these layers is divided both horizontally and vertically by narrow gaps 109, 110 and 111, 112, respectively, between substantially square or rectangular metallization areas although the overall shape of each area is only important to the extent of leaving as much metallization in place to reduce electrical resistance and conduction losses. The preferably circular central area of each division of the metallized area is either an aperture to fit over a pillar or embedded magnetic material such that pillars are built up in layers as the PCB layers are stacked. It should additionally be noted that at least one gap is formed from the central region to the periphery of each separate area to form the ends and connection points of the single-tuna secondary winding. In this example, it is preferred to form two such gaps to provide additional separation and to surface mount or embed a synchronous rectifier at one contact point and a capacitor at the other contact point. (Conversely or additionally, a top and/or bottom switch could be mounted on or embedded in a PCB structure including a primary winding hut is not preferred.) It should also be appreciated that the locations of the synchronous rectifier and the capacitor are preferably reversed between the PCB layers of FIG. 10A and FIG. 10D to facilitate formation of center-tapped windings and to correspond to the layout of the schematic diagram of the DC/DC power converter shown in FIG. 9 and that these connections are preferably made on opposite edges of the PCB layer so that such connections are well-separated from connection to the primary windings on another edge of the primary winding pattern of FIG. 10B. These features of the exemplary preferred embodiment are not at all critical to the successful practice of the invention and largely unimportant to the electrical performance of the matrix transformer in accordance with the invention but are, in fact, preferred as a matter of power converter manufacturing convenience.

The primary winding patterns of FIGS. 10B and 10C are somewhat more complicated in order to accommodate the different directions of windings on horizontally and vertically adjacent pillars and to allow a connection between the windings of pillars #2 and #3 (omitted from FIG. 5A, as noted above) to be made in the PCB metallization pattern of FIG. 10C. Accordingly, it will be noted that the PCB metallization patterns of FIGS. 10B and 10C are each divided into only two areas 113, 114 and 115, 116, respectively, each with the pattern of FIG. 10B being divided by a vertical (as illustrated) gap 117 while the pattern of FIG. 10C is divided by a gap 118 orthogonal thereto. It will also be noted that the PCB layers of FIGS. 10B and 10C also have apertures or groups of apertures, referred to as vias, at the ends of a generally spiral metallization pattern which are aligned in the two patterns such that the two patterns can be connected by placing metal or conductive material within the vias. If such an interlayer connection structure is employed, it is desirable that all of the primary winding layers be grouped together between the secondary winding layers for simplicity in fabricating via connections. As with the secondary winding patterns discussed above, the gaps in the metallization of the respective patterns are kept narrow and as much metallization as possible left in place when the winding patterns are formed. It should also be appreciated that the patterns illustrated in FIGS. 10B and 10C provide for all of the windings to be connected in series and that the connection points are closely adjacent each other at the periphery of the quadrant including pillar #1 to limit inductance of the primary winding connection terminals and leakage inductance.

Following the current directions shown in FIGS. 10B and 10C, current applied at a location in the quadrant including pillar #1 in FIG. 10B is conducted to the coil surrounding pillar #4, transferred to the pattern of FIG. 10C through the vias at the end of the generally spiral pattern where it passes to the primary winding surrounding pillar #3 and passes back to the corresponding primary winding of the pattern of FIG. 10B, again through vias where a series connection to the primary winding surrounding pillar #2, connected back to the pattern of FIG. 10C through vias and then serially connected to the primary winding surrounding pillar #1 and connected back to the corresponding winding of the pattern of FIG. 10B and to the other connection terminal.

In view of the foregoing, it is clearly seen that the invention provides a unitary matrix transformer including a plurality of identical transformers of improved uniformity and reduced magnetic flux density and which can be implemented with windings formed by metallization on or embedded within a printed circuit board-like structure. The printed circuit-like structures can also carry surface mounted or embedded synchronous rectifiers and filter capacitors and in which the metallization is utilized to the greatest extent possible to limit conduction losses and allowing minimization of leakage inductance and connection inductance. Flux density can be further decreased by extending sheets of magnetic material forming portions of the unitary core structure.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A matrix transformer comprising:
   a four layer printed circuit board;
   first and second sheets of magnetic material formed in separate layers on either side of said printed circuit board;
   four pillars of magnetic material extending in a rectangular array between said first and second sheets of magnetic material extending in orthogonal directions to said first and second sheets of magnetic material and through said printed circuit board;
   a metallization pattern of each of the first and fourth layers of the printed circuit board being divided orthogonally by narrow gaps between substantially square or rectangular metallization areas and each of first and fourth layers of the printed circuit board to provide four single turn secondary windings, one in each of the metallization areas for a total of eight single turn secondary windings, leaving as much metallization in place to reduce electrical resistance and conduction losses, the four single turn secondary windings of each of the first and fourth layers of the printed circuit board being aligned with one another, a circular central area of each secondary winding of each division of the metallized area accommodating a magnetic pillar extending between the first and fourth layers to the first and second magnetic sheets, two gaps are formed from the central region to a periphery of each separate area to form the ends and connection points of the single-turn secondary winding to provide additional separation and to surface mount or embed a synchronous rectifier at one contact point and a capacitor at the other contact point, the locations of the synchronous rectifier and the capacitor are reversed between the first and fourth layers of to facilitate formation of center-tapped windings and these connections are made on opposite edges of each of the first and fourth layers; and metallization patterns of each of second and third layers of the printed circuit board being divided into only two areas each with spiral primary winding patterns divided by a gap orthogonally between the second and third layers with vias at the ends of the spiral metallization patterns which are aligned in the two patterns such that the two patterns can be connected by placing metal or conductive material within the vias, the gaps in the metallization of the respective spiral patterns on each of the second and third layers are kept narrow and as much metallization as possible left in place when the winding patterns are formed provide for all of the windings to be connected in series and that the connection points are closely adjacent each other at a periphery of the printed circuit hoard, the four spiral primary windings of each of the second and third layers of the printed circuit board being aligned with one another, a circular central area of each primary winding of each division of the metallized area being aligned with corresponding central areas of circular central areas of the first and second layers of the printed circuit board and accommodating a magnetic pillar extending between the first and fourth layers to the first and second magnetic sheets.

2. The matrix transformer as recited in claim 1, wherein said plurality of four pillars are integrally formed on one of said first and second sheets of magnetic material.

3. The matrix transformer of claim 1, wherein the circular central areas of each of the secondary and primary windings are apertures to fit over the pillars of magnetic material.

4. The matrix transformer of claim 1, wherein the circular central areas of each of the secondary and primary windings are embedded magnetic material in each layer of the four layer printed circuit board such that pillars are built up in the layers as the printed circuit board layers are stacked.

5. A step down, high current power DC/DC converter comprising:
   a DC power source;
   a matrix transformer having a primary winding and a plurality of secondary, windings; and
   a switch for periodically connecting and disconnecting the DC power source to the transformer primary winding at high frequency through a resonant series Cr, Lr connection;
   wherein the matrix transformer comprises:

a four layer printed circuit board;

first and second sheets of magnetic material formed in separate layers on either side of said printed circuit board;

four pillars of magnetic material extending in a rectangular array between said first and second sheets of magnetic material extending in orthogonal directions to said first and second sheets of magnetic material and through said printed circuit board;

a metallization pattern of each of the first and fourth layers of the printed circuit board being divided orthogonally by narrow gaps between substantially square or rectangular metallization areas and each of first and fourth layers of the printed circuit board to provide four single turn secondary windings, one in each of the metallization areas for a total of eight single turn secondary windings, leaving as much metallization in place to reduce electrical resistance and conduction losses, the four single turn secondary windings of each of the first and fourth layers of the printed circuit board being aligned with one another, a circular central area of each secondary winding of each division of the metallized area accommodating a magnetic pillar extending between the first and fourth layers to the first and second magnetic sheets, two gaps are formed from the central region to a periphery of each separate area to form the ends and connection points of the single-turn secondary winding to provide additional separation and to surface mount or embed a synchronous rectifier at one contact point and a capacitor at the other contact point, the locations of the synchronous rectifier and the capacitor are reversed between the first and fourth layers of to facilitate formation of center-tapped windings and these connections are made on opposite edges of each of the first and fourth layers; and metallization patterns of each of second and third layers of the printed circuit board being divided into only two areas each with spiral primary winding patterns divided by a gap orthogonally between the second and third layers with vias at the ends of the spiral metallization patterns which are aligned in the two patterns such that the two patterns can be connected by placing metal or conductive material within the vias, the gaps in the metallization of the respective spiral patterns on each of the second and third layers are kept narrow and as much metallization as possible left in place when the winding patterns are formed provide for all of the windings to be connected in series and that the connection points are closely adjacent each other at a periphery of the printed circuit hoard, the four spiral primary windings of each of the second and third layers of the printed circuit hoard being aligned with one another, a circular central area of each primary winding of each division of the metallized area being aligned with corresponding central areas of circular central areas of the first and second layers of the printed circuit board and accommodating a magnetic pillar extending between the first and fourth layers to the first and second magnetic sheets.

6. The power converter as recited in claim 5, wherein said plurality of four pillars are integrally formed on one of said first and second sheets of magnetic material.

7. The step down, high current power DC/DC converter of claim 5, wherein the circular central areas of each of the secondary and primary windings of the matrix transformer are apertures to fit over the pillars of magnetic material.

8. The step down, high current power DC/DC converter of claim 5, wherein the circular central areas of each of the secondary and primary windings of the matrix transformer are embedded magnetic material in each layer of the four layer printed circuit board such that pillars are built up in the layers as the printed circuit hoard layers are stacked.

* * * * *